(12) United States Patent
Smith

(10) Patent No.: US 10,231,273 B2
(45) Date of Patent: Mar. 12, 2019

(54) VEHICLE WIRELESS DEVICE CONNECTION MANAGEMENT WITH SWITCHOVER OF PRIMARY CONNECTED DEVICE

(71) Applicant: GM Global Technology Operations LLC, Detroit, MI (US)

(72) Inventor: Dustin H. Smith, Auburn Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/612,749

(22) Filed: Jun. 2, 2017

(65) Prior Publication Data

US 2018/0352583 A1 Dec. 6, 2018

(51) Int. Cl.
| | | |
|---|---|---|
| H04W 76/34 | (2018.01) | |
| H04W 76/14 | (2018.01) | |
| H04M 1/725 | (2006.01) | |
| H04W 4/80 | (2018.01) | |
| H04W 92/18 | (2009.01) | |

(52) U.S. Cl.
CPC ......... *H04W 76/14* (2018.02); *H04M 1/7253* (2013.01); *H04M 1/72533* (2013.01); *H04W 4/80* (2018.02); *H04W 76/34* (2018.02); *H04W 92/18* (2013.01)

(58) Field of Classification Search
None
See application file for complete search history.

(56) References Cited

U.S. PATENT DOCUMENTS

| | | | |
|---|---|---|---|
| 2013/0099892 A1* | 4/2013 | Tucker | G07C 9/00309 340/5.61 |
| 2013/0259232 A1* | 10/2013 | Petel | H04L 63/0492 380/270 |
| 2014/0227972 A1* | 8/2014 | Swaminathan | H04B 5/0031 455/41.1 |
| 2016/0292560 A1* | 10/2016 | Ayatollahi | G06K 19/0726 |
| 2016/0321195 A1* | 11/2016 | Ghosh | G06F 1/266 |
| 2017/0208422 A1* | 7/2017 | Grover | H04W 4/008 |

* cited by examiner

*Primary Examiner* — Alejandro Rivero
(74) *Attorney, Agent, or Firm* — Reising Ethington P.C.; David Willoughby

(57) ABSTRACT

A system and method of managing short-range wireless communications between a vehicle and a plurality of personal mobile devices, wherein the method comprises: establishing a first short-range wireless communications (SRWC) connection between a wireless communications device installed in a vehicle and a first personal mobile device using a first wireless protocol, wherein the wireless communications device transmits and receives wireless signals via the first wireless protocol; operating vehicle electronics of the vehicle using the first personal mobile device as a primary connected device; receiving a wireless signal from a second personal mobile device using a second wireless protocol; and based on the wireless signal received from the second mobile device, then carrying out a primary connected device switchover process, wherein the primary connected device switchover process includes operating the vehicle electronics using the second personal mobile device as the primary connected device.

17 Claims, 3 Drawing Sheets

VEHICLE WIRELESS DEVICE CONNECTION MANAGEMENT WITH SWITCHOVER OF PRIMARY CONNECTED DEVICE

INTRODUCTION

The disclosure relates to modifying device priority of a plurality of short-range wireless communications devices.

Many electronic devices now carry out network communications. For example, many electronic devices can transmit voice and data communications over both a short-range wireless network, such as Wi-Fi™, and/or a cellular network, such as GPRS or CDMA. In certain cases, electronic devices may only connect to a single short-range wireless communications (SRWC) device at a given time. Alternatively, an electronic device may be able to connect to multiple SRWC devices, however, in such a case, the electronic device may only be able to give priority to a single device at a given time. In some vehicles, the vehicle electronics may operate using one or more (in many embodiments, there may be one primary connected device at a given time) devices as a primary connected device. Users of the SRWC devices or the electronic devices may not be able to readily swap or modify the primary connected device(s).

SUMMARY

According to a first embodiment, there is provided a method of managing short-range wireless communications between a vehicle and a plurality of personal mobile devices, wherein the method comprises: establishing a first short-range wireless communications (SRWC) connection between a wireless communications device installed in a vehicle and a first personal mobile device using a first wireless protocol, wherein the wireless communications device transmits and receives wireless signals via the first wireless protocol; operating vehicle electronics of the vehicle using the first personal mobile device as a primary connected device; receiving a wireless signal from a second personal mobile device using a second wireless protocol; and based on the wireless signal received from the second mobile device, then carrying out a primary connected device switchover process, wherein the primary connected device switchover process includes operating the vehicle electronics using the second personal mobile device as the primary connected device.

According to other embodiments, there is provided that of the first embodiment further including any one or more of the following:
  wherein the second wireless protocol is near field communication (NFC);
  wherein the wireless signal is received at an NFC reader, wherein the NFC reader includes a SRWC chipset configured to receive wireless signals via the second wireless protocol;
  wherein the wireless signal is a message constructed in according to NFC Data Exchange Format (NDEF);
  wherein the wireless communications device is installed in a vehicle and is separate from the NFC reader, and wherein the NFC reader is electrically coupled to the wireless communications device;
  wherein the wireless communications device comprises a first SRWC chipset that is used to carry out wireless communications via the first protocol and wherein the wireless communications device comprises a second SRWC chipset that is used to carry out wireless communications via the second protocol;
  wherein the second wireless protocol is field communication (NFC), and wherein the first wireless protocol is Wi-Fi™, WiMAX™, ZigBee™, Wi-Fi Direct™, Bluetooth™, Bluetooth Low Energy™ (BLE), or NFC;
  disconnecting the first personal mobile device after receiving the wireless signal from the second personal mobile device at the wireless communications device via the second wireless protocol;
  wherein the primary connected device switchover process includes connecting the second mobile device to the wireless communications device using the first wireless protocol and disconnecting the first personal mobile device from the wireless communications device;
  wherein the primary connected device switchover process includes discontinuing use of the first personal mobile device as the primary connected device; and/or wherein the wireless signal is received from a near field communications (NFC) tag that is attached to the second personal mobile device.

According to a second embodiment, there is provided a method of managing short-range wireless communications between a vehicle and a plurality of personal mobile devices, wherein the method comprises: detecting at a wireless communications device a wireless Bluetooth™ signal that is transmitted by a first personal mobile device that is Bluetooth™ bonded to the wireless communications device, wherein the wireless communications device includes a Bluetooth™ chipset and is installed in a vehicle as a portion of vehicle electronics that are used for operating the vehicle; based on the detection of the wireless Bluetooth™ signal, establishing a first Bluetooth™ connection between the wireless communications device and the first mobile device using a Bluetooth™ protocol, wherein the wireless communications device is configured to transmit and receive data to and from the first mobile device via the first Bluetooth™ connection using the Bluetooth™ chipset; operating the vehicle electronics using the first personal mobile device as a primary connected device with which the wireless communications device transmits and/or receives the data via the first Bluetooth™ connection using the Bluetooth™ chipset; receiving a wireless near-field communication (NFC) signal at the vehicle electronics from a second personal mobile device that is Bluetooth™ bonded to the wireless communications device, wherein the vehicle electronics includes an NFC reader that receives the wireless NFC signal from the second personal mobile device via an NFC protocol; based on the detection of the wireless NFC signal, carrying out a primary connected device switchover process that includes: discontinuing use of the first personal mobile device as the primary connected device; and operating the vehicle electronics using the second personal mobile device as the primary connected device, including communicating with the second personal mobile device by transmitting and/or receiving data via the wireless communications device using the second Bluetooth™ connection.

According to other embodiments, there is provided that of the second embodiment further including any one or more of the following:
  establishing a second Bluetooth™ connection between the wireless communications device and the second mobile device using the Bluetooth™ protocol, wherein the step of establishing a second Bluetooth™ connection occurs either prior to carrying out the primary connected device switchover process or during the primary connected device switchover process prior to the step of discontinuing use of the first mobile device as the primary connected device, and wherein when the step of establishing a second Bluetooth™ connection is carried out prior to the primary connected device switchover process, the method further comprises operating the vehicle electronics using the second mobile device as a secondary connected device until the primary connected device switchover process is carried out;

wherein the primary connected device switchover process further comprises operating the vehicle electronics using the first mobile device as a secondary connected device;

wherein the primary connected device switchover process further comprises terminating the first Bluetooth™ connection with the first mobile device; and/or wherein the primary connected device switchover process further comprises providing a vehicle operator with a prompt requesting confirmation that the second mobile device is to be used as the primary connected device and, in response to receiving an operator confirmation, then carrying out the steps of discontinuing use of the first mobile device as the primary connected device and operating the vehicle electronics using the second mobile device as the primary connected device.

According to a third embodiment, there is provided a method of managing short-range wireless communications between a vehicle and a plurality of short-range wireless communications devices, the method comprising: establishing a first connection between a first short-range wireless communications (SRWC) device and a wireless communications device using a first wireless protocol, wherein the wireless communications device is capable of transmitting and receiving wireless signals via the first wireless protocol, and wherein the wireless communications device is included in vehicle electronics of the vehicle; receiving a wireless NFC signal from a second SRWC device at a near field communication (NFC) reader that is installed as part of the vehicle electronics and that is connected to the wireless communications device, wherein the NFC reader is configured to receive NFC signals, and wherein the wireless NFC signal includes identifying information that can be used to identify the second SRWC device at least for purposes of carrying out a connection between the second SRWC device and the wireless communications device using the first wireless protocol; sending the identifying information from the NFC reader to the wireless communications device; establishing a second connection between the second SRWC device and the wireless communications device using the first wireless protocol; based on the identifying information received from the second SRWC device, configuring the vehicle electronics to operate using the second SRWC device as a primary connected device; and either disconnecting the first SRWC device from the wireless communications device or configuring the vehicle electronics to operate using the first SRWC device as a secondary connected device.

According to other embodiments, there is provided that of the third embodiment further including any one or more of the following:

wherein the first SRWC device is disconnected from the wireless communications device and wherein the second SRWC device is connected to the wireless communications device using the first wireless protocol based on the identifying information received from the second SRWC device;

wherein the first wireless protocol is Wi-Fi™, WiMAX™, ZigBee™, Wi-Fi Direct™, Bluetooth™, Bluetooth Low Energy™ (BLE), or near field communication (NFC); and/or wherein the first SRWC device is a personal mobile device and the second SRWC device is a personal mobile device.

BRIEF DESCRIPTION OF THE DRAWINGS

Exemplary embodiments will hereinafter be described in conjunction with the appended drawings, wherein like designations denote like elements, and wherein.

DETAILED DESCRIPTION

The system and methods below enable a wireless communications device to modify or swap priority or connections between multiple short-range wireless communications (SRWC) devices, such as personal mobile devices. The wireless communications device can transmit and receive wireless messages according to a first SRWC protocol, such as Bluetooth™. In a first scenario, the wireless communications device may only be able to connect to a single personal mobile device using Bluetooth™ (or other SRWC protocol). In a second scenario, the wireless communications device may be able to connect to multiple personal mobile devices using the first protocol. In one embodiment, the vehicle may disconnect a first personal mobile device from the wireless communications device when a wireless signal is received at the vehicle using a second SRWC protocol, such as a near field communication (NFC) protocol. In other embodiments, the vehicle may set the first personal mobile device to operate in a secondary operable mode (a mode that provides limited vehicle-device functionality) and set the second personal mobile device to operate in a primary operable mode. In such an embodiment, if the second personal mobile device is not already connected to the wireless communications device, the second personal mobile device may first be connected.

Figure 1:
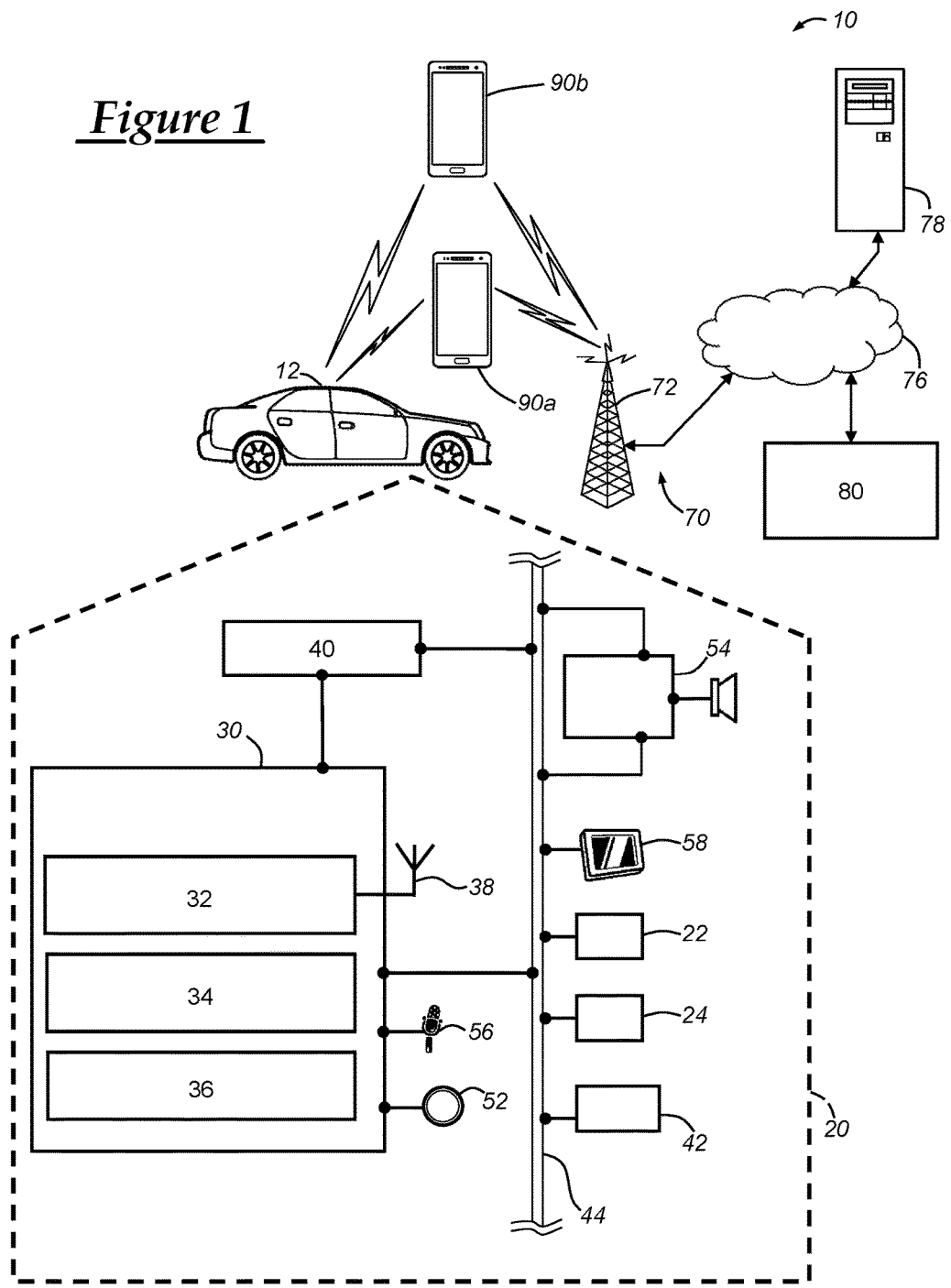
FIG. 1 is a block diagram depicting an embodiment of a communications system that is capable of utilizing the method disclosed herein.

Referring now to FIG. 1, there is shown an operating environment that comprises a communications system 10 and that can be used to implement the method disclosed herein. Communications system 10 generally includes a vehicle 12 with a wireless communications device 30, an NFC reader 40, one or more wireless carrier systems 70, a land communications network 76, a computer 78, a remote facility 80, and personal mobile devices 90a,b. It should be understood that the disclosed method can be used with any number of different systems and is not specifically limited to the operating environment shown here. Also, the architecture, construction, setup, and operation of the system 10 and its individual components are generally known in the art. Thus, the following paragraphs simply provide a brief overview of one such communications system 10; however, other systems not shown here could employ the disclosed method as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which include telematics equipment in vehicle 12). Carrier system 70 can implement any suitable communications technology, including for example GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to remote facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. Each such computer 78 can be used for one or more purposes, such as a web server accessible by vehicle 12. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, remote facility 80, or both. A computer 78 can also be used for providing Internet connectivity such as DNS services or as a network address server that uses DHCP or other suitable protocol to assign an IP address to the vehicle 12.

Remote facility 80 may be designed to provide the vehicle electronics 20 and mobile device 90 with a number of different system back-end functions. For example, remote facility 80 may be used in part to implement a car sharing service. In such a case, remote facility 80 may coordinate registrations of vehicles, store data pertaining to the registrations or other aspects of the car sharing service, and/or provide authentication and authorization data to SRWC devices (e.g., personal mobile devices 90*a,b*), users, and/or vehicles. The remote facility 80 may include one or more switches, servers, databases, live advisors, as well as an automated voice response system (VRS), all of which are known in the art. Remote facility 80 may include any or all of these various components and, preferably, each of the various components are coupled to one another via a wired or wireless local area network. Remote facility 80 may receive and transmit data via a modem connected to land network 76. A database at the remote facility can store account information such as subscriber authentication information, vehicle identifiers, profile records, behavioral patterns, and other pertinent subscriber information. Data transmissions may also be conducted by wireless systems, such as IEEE 802.11x, GPRS, and the like. Although the illustrated embodiment has been described as it would be used in conjunction with a manned remote facility 80 using a live advisor, it will be appreciated that the remote facility can instead utilize a VRS as an automated advisor or, a combination of the VRS and the live advisor can be used.

The personal mobile devices 90*a,b* are SRWC devices and may include: hardware, software, and/or firmware enabling cellular telecommunications and SRWC as well as other mobile device applications. As used herein, a personal mobile device is a device that is capable of SRWC and that is portable by a user, such as a wearable device (e.g., a smartwatch), an implantable device, or a handheld device (e.g., a smartphone, a tablet, a laptop). The hardware of the personal mobile devices 90*a,b* may comprise: a processor and memory (e.g., non-transitory computer readable medium configured to operate with the processor) for storing the software, firmware, etc. The personal mobile devices' processor and memory may enable various software applications, which may be preinstalled or installed by the user (or manufacturer) (e.g., having a software application or graphical user interface or GUI). One implementation of a vehicle-mobile device application may enable a vehicle user to communicate with the vehicle 12 and/or control various aspects or functions of the vehicle, some of which are listed above. Another implementation may enable the user to make a reservation to use a vehicle that is a part of a car sharing service. Additionally, the application may also allow the user to connect with the remote facility 80 or call center advisors at any time.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a wireless communications device 30, an NFC reader 40, a GPS module 22, engine control unit (ECU) 24, other VSMs 42, and numerous other components and devices. Some or all of the different vehicle electronics may be connected for communication with each other via one or more communication busses, such as bus 44. Communications bus 44 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few.

The vehicle 12 can include numerous vehicle system modules (VSMs) as part of vehicle electronics 20, such as the GPS module 22, engine control unit (ECU) 24, wireless communications device 30, a near field communication (NFC) reader 40, vehicle user interfaces 52-58, as will be described in detail below. The vehicle 12 can also include other VSMs 42 in the form of electronic hardware components that are located throughout the vehicle and, which may receive input from one or more sensors and use the sensed input to perform diagnostic, monitoring, control, reporting, and/or other functions. Each of the VSMs 42 is preferably connected by communications bus 44 to the other VSMs, as well as to the wireless communications device 30, and can be programmed to run vehicle system and subsystem diagnostic tests. One or more VSMs 42 may periodically or occasionally have their software or firmware updated and, in some embodiments, such vehicle updates may be over the air (OTA) updates that are received from a computer 78 or remote facility 80 via land network 76 and communications device 30. As is appreciated by those skilled in the art, the above-mentioned VSMs are only examples of some of the modules that may be used in vehicle 12, as numerous others are also possible.

Near field communication (NFC) reader 40 includes an antenna (not shown) and is a short-range wireless communications (SRWC) device that is capable of receiving wireless messages using a NFC technology or protocol. Wireless messages may be received by the NFC reader 40 and, in one embodiment, the wireless messages may be in NFC Data Exchange Format (NDEF) and may be an NDEF message. In some embodiments, wireless messages may be received from NFC tags that come into a close proximity of the NFC reader (e.g., 20 centimeters). In such a case, the wireless message may be an NDEF record stored on an NFC tag that is read by the NFC reader 40. In one embodiment, the NFC reader 40 may read information from an initiator (i.e., a device or article that generates a radio frequency (RF) field), such as an NFC tag or NFC transmitter. The NFC reader 40 may also operate in an NFC peer-to-peer configuration, wherein communications are carried out between the NFC reader 40 (in the peer-to-peer configuration) and another NFC-enable device, such as a smartphone 90a,b, which will be described in more detail below. In other embodiments, the NFC reader 40 may also include a processor, chipset, and/or multiple antennas.

In other embodiments, a different SRWC device or wireless communications device 30 may be used in place of the NFC reader 40, such as a device that is capable of transmitting and/or receiving short-range wireless communications, such as any of the IEEE 802.11 protocols, Wi-Fi™, WiMAX™, ZigBee™, Wi-Fi Direct™, Bluetooth™ and/or Bluetooth Low Energy™ (BLE). The NFC reader (or other SRWC device) may be connected to wireless communications device 30 and/or bus 44. As will be discussed more below, the NFC reader 40 may receive wireless messages and then forward these messages to wireless communications device 30 or another VSM.

Wireless communications device 30 is capable of communicating data via short-range wireless communications (SRWC). As shown in the exemplary embodiment of FIG. 1, wireless communications device 30 includes a wireless access point 32, a processor 34, memory 36, and one or more antennas 38 (only one is shown for illustrative purposes). In many embodiments, the wireless communications device 30 may be specifically configured to carry out the method disclosed herein. In one embodiment, wireless communications device 30 may be a standalone module or, in other embodiments, device 30 may be incorporated or included as a part of one or more other vehicle system modules, such as a center stack module (CSM), body control module, an infotainment module, a telematics module, a head unit, and/or a gateway module. In some embodiments, the device 30 can be implemented as an OEM-installed (embedded) or aftermarket device that is installed in the vehicle.

Wireless communications device 30 can be configured to communicate wirelessly according to one or more wireless protocols, including short-range wireless communications (SRWC) such as any of the IEEE 802.11 protocols, Wi-Fi™, WiMAX™, ZigBee™, Wi-Fi Direct™, Bluetooth™, Bluetooth Low Energy™ (BLE), or near field communication (NFC). The short-range wireless communication chipset 32 enables the wireless communications device 30 to transmit and receive SRWC, such as BLE. The SRWC chipset may allow the device 30 to connect to another SRWC device. As used herein, a short-range wireless communications (SRWC) device is a device capable of SRWC. Additionally, in some embodiments, the wireless communications device may contain a cellular chipset thereby allowing the device to communicate via one or more cellular protocols, such as those used by cellular carrier system 70.

In one embodiment, the wireless communications device 30 may operate both when the vehicle is in a powered on state and when the vehicle is in a powered off state. As used herein, a "powered on state" is a state of the vehicle in which the ignition or primary propulsion system of the vehicle is powered on and, as used herein, a "powered off state" is a state of the vehicle in which the ignition or primary propulsion system of the vehicle is not powered on. The operation or state of the wireless communications device 30 may be controlled by another vehicle system module, such as by a BCM or by an infotainment module. In the powered on state, the wireless communications device 30 may always be kept "on" or supplied with power from a vehicle battery or other power source. In the powered off state, the wireless communications device 30 may be kept in a low-power mode or may be supplied power periodically so that device 30 may wake up and perform operations.

The vehicle may use the wireless communications device 30 to detect other SRWC devices, such as personal mobile devices 90a,b. A connection between the wireless communications device 30 and one or more devices 90a,b may allow for the operation of various vehicle-device functionality. Vehicle-device functionality refers to any function of the vehicle that may be complimented, improved, supported, or carried out through a personal mobile device; any function of the personal mobile device that may be complimented, improved, supported, or carried out through the vehicle; or any other function that may be carried out using the vehicle and one or more personal mobile devices. For example, vehicle-device functionality can include using the personal mobile device to provide the vehicle with a contact list that may be displayed on visual display 58, audio/visual media content to be played via speakers 54 or display 58, navigational information (e.g., start and/or end locations), and/or vehicle commands or instructions that direct the vehicle to perform some operation. Other examples of vehicle-device functionality include using the vehicle electronics to provide the personal mobile device with hands-free calling, such as through use of vehicle-user interfaces to place, receive, and carry out voice calls; sending information to the personal mobile device, such as geographical information to the personal mobile device (such as information obtained from the GPS module 22) or vehicle diagnostic information or codes; and carrying out commands received at the vehicle from the personal mobile device.

Upon detection of a SRWC device (e.g., a personal mobile device) or receipt of a wireless message, the wireless communications device 30 may communicate with the SRWC device by transmitting and receiving one or more wireless messages. These messages may include authenticating or otherwise verifying the identity of the SRWC device which sent (or ostensibly sent) the wireless message, authorizing the SRWC device using one or more authorization techniques (as discussed more below), and/or pairing the SRWC device and the wireless communications device 30 (e.g., such as through Bluetooth™ or Bluetooth Low Energy™ pairing). Additionally, upon detection of a SRWC device, the wireless communications device 30 may determine whether the wireless communications device 30 is bonded to the SRWC device. As used herein, "bonded" means that two devices (e.g., the wireless communications device 30 and personal mobile device 90a) have previously been paired and each stores a common secret key, identifier, and/or other information that allows the devices to subsequently establish a new Bluetooth™ connection without pairing (i.e., exchanging security codes or keys). "Bluetooth™ bonded" refers to devices that are bonded using Bluetooth™ as the SRWC. As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed.

Once a connection is established between the wireless communications device 30 and the personal mobile device, such as mobile device 90a, wireless messages may be sent between the vehicle and the personal mobile device. These wireless messages and/or the SRWC that sent these wireless messages may be authenticated and/or authorized by the vehicle. The authorization and/or authentication of the personal mobile device (or other SRWC device) may include verifying the identity of the personal mobile device and/or the user of the personal mobile device, as well as checking for authorization of the personal mobile device and/or the user of the personal mobile device. This verification may include comparing a key (e.g., a string or array of bits) included in the connection request (or subsequent message) with a key that the vehicle obtained from a remote facility 80.

The communications between the vehicle and the personal mobile devices may allow for functionality of the smartphone to be used by the vehicle electronics, or vice versa. For example, in the case where the personal mobile device is a cellular-enabled smartphone, received calls at the smartphone may be carried out through the audio system 54 and/or through use of microphone 56 of the vehicle electronics 20. This may be done so through the phone sending all received audio data or signals to the wireless communications device 30, which then may use bus 44 to send the audio signals to audio system 54. Likewise, video received at the smartphone 90a may be sent to the visual display 58 via the wireless communications device 30. Also, audio received at microphone 56 in the vehicle electronics may be sent to the smartphone 90a via wireless communications device 30.

In some embodiments, only a single personal mobile device may be connected to the wireless communications device 30 at a given time. In other embodiments, multiple personal mobile devices may be able to be connected to the wireless communications device 30 at the same time, but, in such an embodiment, only one of these devices may be set to operate in a primary operable mode while the other devices are set to a secondary operable mode. A primary operable mode is a mode in which a personal mobile device may carry out its normal operations, which may include certain vehicle-device functionality. A secondary operable mode is a mode in which a personal mobile device is able to carry out or perform limited vehicle-device functionality with respect to the functionality it would be able to carry out were it the only device connected to the wireless communications device or were it operating in the primary operable mode. If there is one device connected to the wireless communications device 30, then the connected device is set to operate in a primary operable mode. If multiple devices are connected to the wireless communications device, then there may be a device set to operate in a primary operable mode and the other devices may be set to operate in a secondary operable mode.

For example, if two smartphones are connected to the wireless communications device 30 then the vehicle may only enable one of the devices (the device set to operate in the primary operable mode) to operate in conjunction with the vehicle via the wireless communications device 30 such that the vehicle may be used to initiate phone calls and/or stream media from the primary device (i.e., the device set to operate in the primary operable mode). In such a case, the secondary device (i.e., the device set to operate in the secondary operable mode) may still be connected to the vehicle, but the secondary device may only use the vehicle electronics to answer calls received on the secondary device.

Wireless communications device 30 may be in communication with one or more remote networks via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30 via, for example, a telematics unit included in the vehicle. In one embodiment, the communications device 30 may also include a cellular chipset or be communicatively coupled to a device comprising a cellular chipset such as a telematics unit. In either event, communications device 30 may, via a cellular chipset, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel. Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 34 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 34 executes various types of digitally-stored instructions, such as software or firmware programs stored in memory 36, which enable the device 30 to provide a wide variety of services. For instance, processor 34 can execute programs or process data to carry out at least a part of the method discussed herein. In one embodiment, device 30 includes an application that enables the method described below in FIG. 2. Memory 36 may include RAM, other temporary powered memory, any non-transitory computer-readable medium (e.g., EEPROM), or any other electronic computer medium that stores some or all of the software needed to carry out the various external device functions discussed herein.

Global position system (GPS) module 22 receives radio signals from a constellation of GPS satellites (not shown). From these signals, the module 22 can determine vehicle position which may enable the vehicle to determine whether it is at a known location, such as home or workplace. Moreover, GPS module 22 can provide this location data to wireless communications device 30, which can then use this data to identify known locations, such as a vehicle operator's home or workplace. Additionally, GPS module 22 may be used to provide navigation and other position-related services to the vehicle operator. Navigation information can be presented on the display 58 (or other display within the vehicle) or can be presented verbally such as is done when supplying turn-by-turn navigation. The navigation services can be provided using a dedicated in-vehicle navigation module (which can be part of GPS module 22), or some or all navigation services can be done via a telematics unit installed in the vehicle, wherein the position information is sent to a remote location for purposes of providing the vehicle with navigation maps, map annotations (points of interest, restaurants, etc.), route calculations, and the like. The position information can be supplied to remote facility 80 or other remote computer system, such as computer 78, for other purposes, such as fleet management and/or for use in a car sharing service. Also, new or updated map data can be downloaded to the GPS module 22 from the remote facility 80 via a vehicle telematics unit.

Vehicle electronics 20 also includes a number of vehicle user interfaces that provide vehicle occupants with a means of providing and/or receiving information, including pushbutton(s) 52, audio system 54, microphone 56, and visual display 58. As used herein, the term "vehicle user interface" broadly includes any suitable form of electronic device, including both hardware and software components, which is located on the vehicle and enables a vehicle user to communicate with or through a component of the vehicle. The pushbutton(s) 52 allow manual user input into the communications device 30 to provide other data, response, or control input. Audio system 54 provides audio output to a vehicle occupant and can be a dedicated, stand-alone system or part of the primary vehicle audio system. According to the particular embodiment shown here, audio system 54 is operatively coupled to both vehicle bus 44 and an entertainment bus (not shown) and can provide AM, FM and satellite radio, CD, DVD and other multimedia functionality. This functionality can be provided in conjunction with or independent of an infotainment module. Microphone 56 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 58 is preferably a graphics display, such as a touch screen on the instrument panel or a heads-up display reflected off of the windshield, and can be used to provide a multitude of input and output functions. Various other vehicle user interfaces can also be utilized, as the interfaces of FIG. 1 are only an example of one particular implementation.

Figure 2:
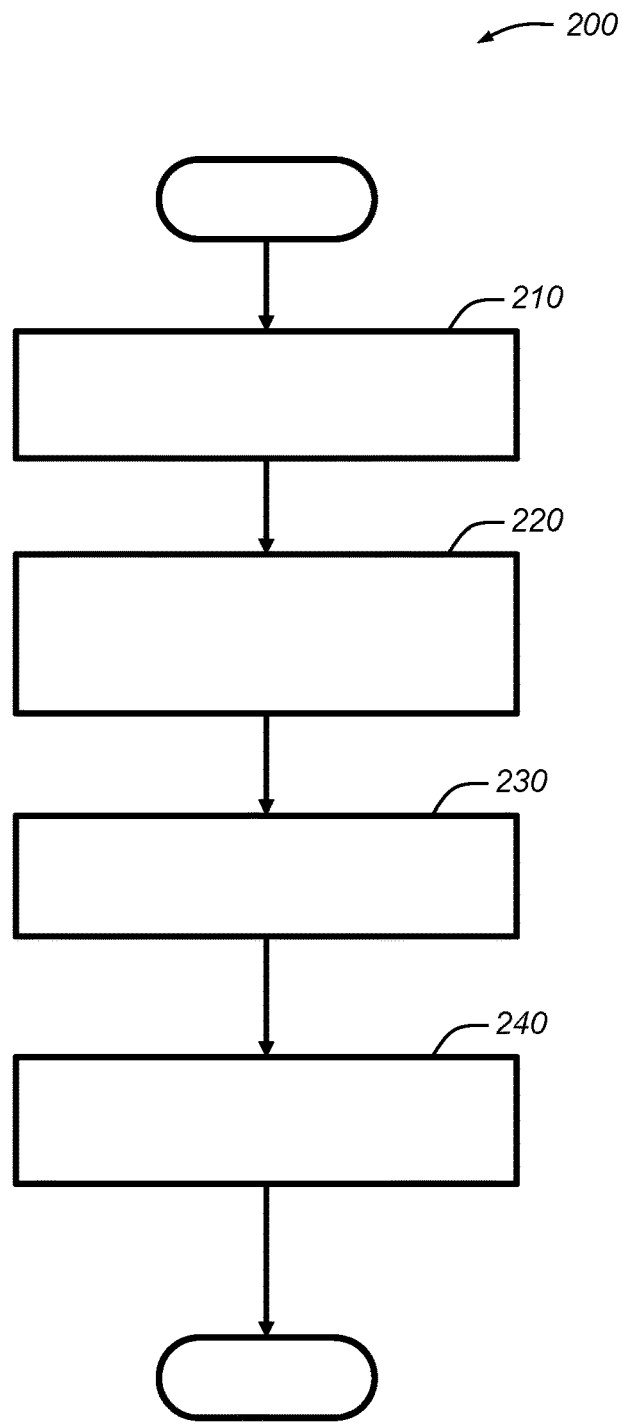
FIG. 2 is a flowchart illustrating a method of managing short-range wireless communications between a vehicle and a plurality of personal mobile devices.
Figure 3:
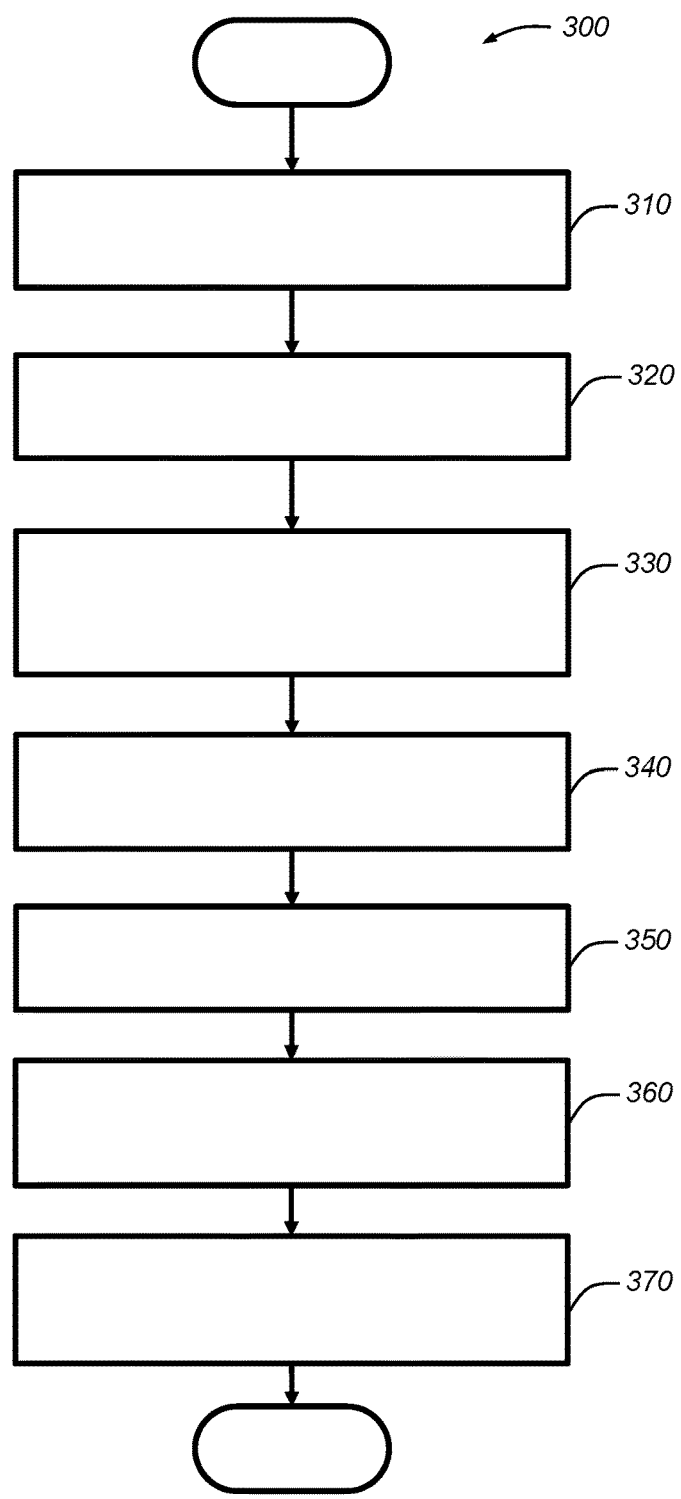
FIG. 3 is a flowchart illustrating a method of managing short-range wireless communications between a vehicle and a plurality of personal mobile devices.

With reference to FIG. 2 and FIG. 3, there is shown two embodiments of a method (method 200 and method 300, respectively) of managing short-range wireless communications between a vehicle and a plurality of personal mobile devices. In a first scenario, the wireless communications device 30 included in a vehicle may provide certain functionality to a single short-range wireless communication (SRWC) device, such as a personal mobile device. Method 200 is applicable to such a scenario and will be discussed in detail below.

In a second scenario, the wireless communications device 30 may be able to connect to multiple personal mobile devices and the vehicle electronics may operate using a certain personal mobile device as a primary connected device. When multiple personal mobile devices (or SRWC devices) are connected to the vehicle via the wireless communications device, the vehicle electronics may be able to offer certain functionality to a single personal mobile device (the "primary connected device"), but only able to offer limited functionality to the other personal mobile devices ("secondary connected devices"). For example, the limited functionality that is offered to the secondary connected devices may be a subset of that functionality that is offered to the primary connected devices or may be a subset of that functionality that would be offered to the secondary connected devices as if they were primary connected devices. Method 300 is applicable to this second scenario (i.e., where the wireless communications device is able to connect to multiple SRWC devices at once), as well as the first scenario, and will be discussed in detail below. It should be appreciated, that these scenarios are only examples and that the steps of methods 200 and 300 may be carried out in any suitable order or combination For example, a user may possess two personal mobile devices, such as a first personal smartphone 90a and a second work smartphone 90b. The user may enter and start his/her vehicle and connect the personal smartphone 90a. In the first scenario where the wireless communications device included in the vehicle is only able to connect a single device using the first SRWC protocol at any given time, smartphone 90a may be disconnected when it is desirable to connect smartphone 90b. Such a scenario is referred to in the following description of method 200. Although the exemplary embodiments of methods 200 and 300 are discussed with reference to personal mobile devices, other SRWC devices may be used as well.

With reference to FIG. 2, method 200 begins with step 210, wherein a first short-range wireless communications (SRWC) connection is established between a wireless communications device installed in a vehicle and a first personal mobile device using a first wireless protocol. The first SRWC connection may be established through the wireless communications device transmitting and/or receiving wireless signals via the first wireless protocol. The first personal mobile device can be a SRWC device and may be a primary device of the vehicle user, such as personal smartphone 90a. Before establishing a connection, the wireless communications device 30 may determine that a SRWC device (such as the first personal mobile device) is available for establishing a SRWC connection based on one or more wireless communications sent by and/or received from the first personal mobile device, such as a beacon signal sent by the first personal mobile device, a response to a beacon signal that was sent by the wireless communications device, or a response to a directed advertisement sent by the wireless communications device. The wireless communications device 30 may carry out subsequent communications with the first personal mobile device to establish a connection. The establishing of the connection may include exchanging certain information, such as public keys or device identifiers, and/or may include verifying information, such as pre-shared private keys and/or device identifiers.

In some scenarios, the vehicle may only detect a single personal mobile device 90 via the wireless communications device 30 and, thus, may automatically determine to connect to the single detected personal mobile device 90. In some embodiments, it may be useful to first make one or more determinations before connecting to the first personal mobile device 90, such as determining whether it is desirable to connect to a SRWC device at all or whether another preferred SRWC device (or personal mobile device) is likely to momentarily come into range of the wireless communications device 30. In other scenarios, the vehicle may detect multiple SRWC devices and may choose to connect to a preferred device according to one or more aspects and/or based on one or more determinations, as discussed below. Also, the vehicle may determine to connect to both devices and, if so, may determine which device to use as a primary device when operating the vehicle electronics (see FIG. 3 and accompanying text below).

As mentioned above, in some embodiments, the vehicle may need to make determinations as to which device to connect to and/or which device to set to operate in the primary operable mode. The vehicle may record information that may be useful in such determinations, such as pairing information that was obtained during previous the establishment of connections between the wireless communications device 30 and devices 90a,b. Upon detection of a personal mobile device that is bonded to the wireless communications device 30 or otherwise known to the vehicle, the vehicle may then automatically connect to this personal mobile device.

In some embodiments, the vehicle may have records stored in memory 36 information pertaining to specific device usage, such as certain times that are associated with usage of certain personal mobile devices. For example, the vehicle may store information indicating a time when a certain personal mobile device was connected to the vehicle via the wireless communications device. For example, the stored time could be the time of day (e.g., 9:00 AM, 12:00 PM, 5:00 PM), the day of the week (e.g., Monday, Tuesday), or the type of day (e.g., work day, holiday, weekend). The records may include SRWC device identifiers, such as media access control (MAC) addresses, given device names (e.g., John's Work Phone), Bluetooth™ addresses (BD_ADDR), or other device identifiers. Additionally, the records may indicate whether the connected device is set to operate in a primary or secondary operable mode. The records may be automatically generated by the vehicle based on past usage or predicted future usage. For example, the vehicle could sync with a user's calendar via personal mobile device 90a or via a remote device (e.g., computer 78 or a device at remote facility 80). The user's calendar may then be used by the vehicle (or the remote device) to determine or predict at which times the user would like certain devices to connect to the wireless communications device or which devices should be configured or set to operate in the primary or secondary operable mode.

For example, a user's calendar may indicate that the user has work from 9:00 AM to 5:00 PM and, thus, if the user enters his/her vehicle at 12:00 PM with both the personal and work smartphones 90a,b, then the vehicle may automatically connect the work smartphone 90b. Alternatively, the phone 90b may be connected and configured as the primary device and phone 90b may be connected and configured as the secondary device, as will be discussed more below with respect to FIG. 3.

Alternatively or additionally, preference records configured by a user regarding preferred devices may be stored at the vehicle, such as in memory 36 of wireless communications device 30. These preference records may include certain times (e.g., times of day, days of the week, the types of days) associated with a personal mobile device identifier that indicates when the user desires to connect certain personal mobile devices to the vehicle. In one embodiment, the preference records can be configured by a user via the vehicle-user interfaces or another device, such as a personal mobile device 90 or computer 78 via an online portal.

Wireless communications device 30 may determine that a personal mobile device is available for establishing a SRWC connection based on one or more wireless communications sent by and/or received from the personal mobile device, such as a beacon signal sent by the personal mobile device, a response to a beacon signal that was sent by the wireless communications device, or a response to a directed advertisement sent by the wireless communications device. The wireless communications device 30 may carry out subsequent communications with the personal mobile device to establish a connection. The establishing of the connection may include exchanging certain information, such as public keys or device identifiers, and/or may include verifying information, such as pre-shared private keys and/or device identifiers. In one embodiment, one-touch Bluetooth™ pairing using NFC may be used, which is discussed more below. The method 200 proceeds to step 220.

In step 220, a wireless signal from a second personal mobile device received using a second wireless protocol. The second personal mobile device can be a SRWC device, such as a work smartphone 90b and the second wireless protocol may be a near field communication (NFC) protocol. In one embodiment, the wireless message may be received at NFC reader 40 or, in another embodiment, the wireless message may be received at wireless communications device 30. The NFC reader 40 may include an NFC chipset (not shown) and an antenna (not shown) that may be used to receive messages. As mentioned above, at least in some embodiments, the NFC reader 40 may be able to transmit NFC messages as well. Additionally, the NFC reader 40 may transfer messages or data to other modules or components included in vehicle electronics 20 via bus 44 or via a direct connection such as that connection illustrated in FIG. 1 between NFC reader 40 and wireless communications device 30.

The wireless message received from the second personal mobile device may be a wireless signal that is generated and sent using a SRWC chipset (e.g., NFC chipset) from the second personal mobile device 90b. In another embodiment, a radio frequency identification (RFID) tag, such as an NFC tag, may be attached to the personal mobile device and, when the tag is placed close to the NFC reader 40, the NFC reader may read the information stored on the tag. In some embodiments, the wireless message may be in NFC Data Exchange Format (NDEF) and may be an NDEF message. In some embodiments, the wireless message may be received from an NFC tag coming into a close proximity of the NFC reader. In such a case, the wireless message may be an NDEF record stored on an NFC tag that is read by the NFC reader 40.

The message may include two portions, a metadata portion and a payload portion. The metadata portion may include information regarding the message itself, such as the record ID and certain information relating to the format of the message. The payload portion may contain the information that is to be read and used by the vehicle, such as the SRWC device identifier and/or other information, such as security codes or keys (e.g., a public or private key that may be used in communications between the personal mobile device 90b and another device, such as the NFC reader 40). The message may contain various information, such as an SRWC device identifier (e.g., a BD_ADDR), message identifiers (e.g., a record ID of the message), or other information that may allow the vehicle to associate the second personal mobile device with a bonded device. For example, during an initial pairing session, a user may select an option using vehicle-user interfaces that configure the personal mobile device or vehicle electronics to operate such that an NFC message received at NFC reader 40 from the second device 90b may be used to recognize the second device using another SRWC protocol, such as the first SRWC protocol (e.g., Bluetooth™).

For example, during an initial pairing process (e.g., an initial Bluetooth™ pairing process), the visual display 58 of vehicle electronics 20 may prompt a user to enter an NFC identifier (such as an identifier of an NFC tag) to be associated with a personal mobile device (e.g., the second personal mobile device). Thus, the vehicle electronics may associate the received NFC identifier with another SRWC identifier, such as a Bluetooth™ device address (BD_ADDR). Then, for example, upon step 220, the second personal mobile device may transmit the NFC identifier which can then be used by the vehicle electronics to determine the BD_ADDR or other SRWC identifier. This SRWC identifier can then be used to connect the second personal device to the wireless communications device 30, as will be discussed in step 240.

In another embodiment, during or after an initial SRWC connection between a personal mobile device and wireless communications device 30, the mobile device may send certain information, such as an NFC identifier or other identifying information that may be used to later recognize a specific device via the NFC message received in step 220. This information may then be stored in memory in the vehicle electronics, such as in memory 36. Then, upon receiving wireless signal from a second personal mobile device, the memory 36 may be queried to allow the vehicle to determine the identity of the second personal mobile device such that a connection via the first SRWC may be established (see step 240).

In yet another embodiment, one-touch Bluetooth™ pairing using NFC may be used for establishing an initial Bluetooth™ pairing to connect a personal mobile device to wireless communications device 30. One-touch Bluetooth™ pairing using NFC is known in the art and the particulars will be known to those skilled in the art. This type of paring generally includes exchanging Bluetooth™ or BLE Out-of-Band (OOB) data via NFC, enabling Bluetooth™ Interlaced Page Scan, and, scanning for a remote Bluetooth paging device, such as wireless communications device 30. One-touch Bluetooth™ using NFC may allow for a faster and/or easier Bluetooth™ pairing.

Once the message is received by the NFC reader 40, the wireless message may be sent to the wireless communications device 30 directly or via bus 44. The wireless message may be decrypted, decoded, parsed, split, or otherwise processed as to obtain information stored therein or inferred therefrom. Such processing may be done by processor 34 of wireless communications device 30, NFC reader 40 (which may include a processor), or another VSM included in vehicle electronics 20. Any or all of this information may be stored in memory 36 or other memory included in vehicle electronics 20. The method 200 proceeds to step 230.

In step 230, the first personal mobile device is disconnected from the wireless communications device after receiving the wireless signal from the second personal mobile device. In one embodiment, disconnecting of the first personal mobile device 90a may be performed through discontinuing communications using the first wireless protocol with the personal mobile device 90a. In other embodiments, a termination message (i.e., a message indicating that the connection will be terminated) may be sent by the wireless communications device 30. The method 200 proceeds to step 240.

In step 240, the second personal mobile device is connected to the wireless communications device using the first wireless protocol. This step may be carried out according to any one or more of those embodiments described above in step 210 with the difference being that the second personal mobile device 90b is connected to the wireless communications device 30 instead of the first personal mobile device 90a. If the second mobile device 90b is bonded or known to the wireless communications device 30, then establishment of the connection between the second personal mobile device and the wireless communications device may be carried out without having to exchange security codes or keys. Otherwise, if the second mobile device 90b is not bonded or known to the wireless communications device 30, then a pairing process between the second personal mobile device and the wireless communications device may be carried out, which may include the exchange of security codes and/or keys. In one example, one touch Bluetooth™ pairing using NFC may be used (discussed above) and/or another initial pairing process may be carried out, some of which are discussed above. The method 200 then ends.

With reference to FIG. 3, an embodiment that may be used in a second scenario is presented, specifically where the wireless communications device is able to connect multiple devices, but the vehicle electronics may use a single personal mobile device (or other SRWC device) as a primary connected device at a given time. In one scenario, personal smartphone 90a may be used by vehicle electronics 20 as a primary connected device and work smartphone 90b may be used by vehicle electronics 20 as a secondary connected device. The primary connected device (in this scenario, device 90a) and the vehicle may provide one another with numerous vehicle-device functionality, such as providing the vehicle with contacts to be populated in a contact list on visual display 58, audio/visual media content to be played via speakers 54 or display 58, and use of vehicle-user interfaces to place, receive, and carry out voice calls using the smartphone 90a. The secondary connected device (in this scenario, device 90b) may only be able to communicate with the vehicle for purposes of receiving calls. Method 300 may also be used during the first scenario and, it should be appreciated, that these scenarios are only examples and that the steps of methods 200 and 300 may be carried out in any suitable order or combination.

The method 300 begins with step 310, wherein a wireless Bluetooth™ signal that is transmitted by a first personal mobile device is detected at a wireless communications device. In some embodiments, the first personal mobile device is Bluetooth™ bonded to the wireless communications device. The message include a request to establish a Bluetooth™ connection (such as a pairing request) or, in the case the first personal mobile device is already Bluetooth™ bonded to the wireless communications device, the message may be encrypted according to security codes or keys that were previously exchanged during a pairing process. The method 300 proceeds to step 320.

In step 320, a first Bluetooth™ connection between the wireless communications device and the first mobile device using a Bluetooth™ protocol is established. This step may be based on the detection of the wireless Bluetooth™ signal and/or may be carried out in the same manner as that of step 210 discussed above. In one embodiment, the wireless communications device 30 may be the master device and the personal mobile devices 90a,b may be slave devices. In such a scenario, the wireless communications device 30 may connect to device 90a using Bluetooth™ according to a master-slave approach, as those skilled in the art will appreciate. The method 300 proceeds to step 330.

In step 330, the vehicle electronics operates using the first personal mobile device as a primary connected device with which the wireless communications device transmits and/or receives the data via the first Bluetooth™ connection using the Bluetooth™ chipset. In some embodiments, the vehicle electronics 20 may transmit and receive data from the first personal mobile device to carry out certain vehicle-device functions, such as providing a contact list or media content to the vehicle. The method proceeds to step 340.

In step 340, receiving a wireless near-field communication (NFC) signal at the vehicle electronics from a second personal mobile device that is Bluetooth™ bonded to the wireless communications device. This step may be carried out in a similar manner as that discussed above with respect to step 220. For example, the vehicle electronics may receive the wireless NFC signal using NFC reader 40 from the second personal mobile device 90b via an NFC protocol. The method 300 continues to step 350.

In step 350, a primary connected device switchover process is carried out based on the detection of the wireless NFC signal. The primary connected device switchover process may include the steps of discontinuing use of the first personal mobile device as the primary connected device (step 360); and operating the vehicle electronics using the second personal mobile device as the primary connected device, including communicating with the second personal mobile device by transmitting and/or receiving the data via the wireless communications device using the second Bluetooth™ connection (step 370).

In one embodiment, primary connected device switchover process may include the steps of providing a vehicle operator with a prompt requesting confirmation that the second mobile device is to be used as the primary connected device and, in response to receiving an operator confirmation, then carrying out the steps of discontinuing use of the first mobile device as the primary connected device and operating the vehicle electronics using the second mobile device as the primary connected device. For example, the vehicle may use any one or more of the vehicle-user interfaces, such as display 58 or audio system 54, to provide a prompt to the user. After the prompt is provided, the vehicle electronics 20 may receive a confirmation from the user that indicates whether or not the user desires to have vehicle electronics 20 operate using the second personal mobile device as the primary connected device. Once the vehicle receives an affirmative confirmation response (i.e., a confirmation indicating the user desires to have vehicle electronics 20 operate using the second personal mobile device as the primary connected device), the vehicle may carry out the rest of the primary connected device switchover process. Otherwise, the method 300 may end or proceed back to step 330.

In step 360, use of the first personal mobile device as the primary connected device is discontinued. In one embodiment, discontinuing use of the first personal mobile device as the primary connected device can include operating the vehicle electronics using the first mobile device as a secondary connected device.

In another embodiment, discontinuing use of the first personal mobile device as the primary connected device can include terminating the first Bluetooth™ connection with the first mobile device. This may be desirable in a case according to the first scenario described above and, thus, terminating the first Bluetooth™ connection with the first mobile device may be carried out in a similar manner as to those described above in step 230. The method continues to step 370.

In step 370, the vehicle electronics operates using the second personal mobile device as the primary connected device. This step can be carried out according to those embodiments or examples described above in steps 310, 320, and/or 330, except with respect to the second personal mobile device. In one embodiment, the primary connected device switchover process can include establishing a second Bluetooth™ connection between the second personal mobile device and the wireless communications device.

In other embodiments, a second Bluetooth™ connection between the second personal mobile device and the wireless communications device may be established prior to the primary connected device switchover process, such as before any of steps 310-350.

In such an embodiment, the wireless communications device 30 may be connected to multiple personal mobile devices (or SRWC), such as devices 90a and 90b. After the first and second personal mobile devices are connected to wireless communications device 30, the vehicle electronics 20 may operate using the second mobile device as a secondary connected device until the primary connected device switchover process is carried out. The method 300 then ends.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive or. As an example, the phrase "A, B, and/or C" includes: "A"; "B"; "C"; "A and B"; "A and C"; "B and C"; and "A, B, and C."

The invention claimed is:
1. A method of managing short-range wireless communications between a vehicle and a plurality of personal mobile devices, wherein the method comprises:
  establishing a first short-range wireless communications (SRWC) connection between a wireless communications device installed in a vehicle and a first personal mobile device using a first wireless protocol, wherein the wireless communications device transmits and receives wireless signals via the first wireless protocol;
  operating vehicle electronics of the vehicle using the first personal mobile device as a primary connected device;
  receiving a wireless signal from a second personal mobile device using a second wireless protocol, wherein the wireless signal is received at a time when the second personal mobile device and the vehicle are bonded with one another for purposes of connecting using the first wireless protocol; and
  based on the wireless signal received from the second mobile device, then carrying out a primary connected device switchover process, wherein the primary connected device switchover process includes operating the vehicle electronics using the second personal mobile device as the primary connected device and disconnecting the first personal mobile device from the wireless communications device after receiving the wireless signal from the second personal mobile device at the wireless communications device via the second wireless protocol so that only a single one of the first personal mobile device and the second personal mobile device is connected to the vehicle using the first wireless protocol at any given time.

2. The method of claim 1, wherein the second wireless protocol is near field communication (NFC).

3. The method of claim 2, wherein the wireless signal is received at an NFC reader, wherein the NFC reader includes a SRWC chipset configured to receive wireless signals via the second wireless protocol.

4. The method of claim 3, wherein the wireless signal is a message constructed according to NFC Data Exchange Format (NDEF).

5. The method of claim 3, wherein the wireless communications device is installed in the vehicle and is separate from the NFC reader, and wherein the NFC reader is electrically coupled to the wireless communications device.

6. The method of claim 1, wherein the wireless communications device comprises a first SRWC chipset that is used to carry out wireless communications via the first wireless protocol and wherein the wireless communications device comprises a second SRWC chipset that is used to carry out wireless communications via the second wireless protocol.

7. The method of claim 6, wherein the second wireless protocol is near field communication (NFC), and wherein the first wireless protocol is Wi-Fi, WiMAX, ZigBee, Wi-Fi direct, Bluetooth, Bluetooth Low Energy (BLE), or NFC.

8. The method of claim 1, wherein the primary connected device switchover process includes connecting the second personal mobile device to the wireless communications device using the first wireless protocol and disconnecting the first personal mobile device from the wireless communications device.

9. The method of claim 1, wherein the primary connected device switchover process includes discontinuing use of the first personal mobile device as the primary connected device.

10. The method of claim 1, wherein the wireless signal is received from a near field communications (NFC) tag that is attached to the second personal mobile device.

11. A method of managing short-range wireless communications between a vehicle and a plurality of personal mobile devices, wherein the method comprises:
  detecting at a wireless communications device a wireless Bluetooth signal that is transmitted by a first personal mobile device that is Bluetooth bonded to the wireless communications device, wherein the wireless communications device includes a Bluetooth chipset and is installed in a vehicle as a portion of vehicle electronics that are used for operating the vehicle;
  based on the detection of the wireless Bluetooth signal, establishing a first Bluetooth connection between the wireless communications device and the first personal mobile device using a Bluetooth protocol, wherein the wireless communications device is configured to transmit and receive data to and from the first personal mobile device via the first Bluetooth connection using the Bluetooth chipset;
  operating the vehicle electronics using the first personal mobile device as a primary connected device with which the wireless communications device transmits and/or receives the data via the first Bluetooth connection using the Bluetooth chipset;
  receiving a wireless near-field communication (NFC) signal at the vehicle electronics from a second personal mobile device that is Bluetooth bonded to the wireless communications device, wherein the vehicle electronics includes an NFC reader that receives the wireless NFC signal from the second personal mobile device via an NFC protocol;
  based on the detection of the wireless NFC signal, carrying out a primary connected device switchover process that includes:
    discontinuing use of the first personal mobile device as the primary connected device;
    operating the vehicle electronics using the second personal mobile device as the primary connected device in a primary operable mode, including communicating with a second personal mobile device by transmitting and/or receiving data via the wireless communications device using the second Bluetooth connection; and
    operating the vehicle electronics using the first personal mobile device as a secondary connected device in a secondary operable mode, wherein the secondary operable mode is a mode that provides limited vehicle-device functionality relative to the primary operable mode.

12. The method of claim 11, further comprising establishing the second Bluetooth connection between the wireless communications device and the second personal mobile device using the Bluetooth protocol, wherein the step of establishing a second Bluetooth connection occurs either prior to carrying out the primary connected device switchover process or during the primary connected device switchover process prior to the step of discontinuing use of the first personal mobile device as the primary connected device, and wherein when the step of establishing a second Bluetooth connection is carried out prior to the primary connected device switchover process, the method further comprises operating the vehicle electronics using the second personal mobile device as a secondary connected device until the primary connected device switchover process is carried out.

13. The method of claim 11, wherein the primary connected device switchover process further comprises providing a vehicle operator with a prompt requesting confirmation that the second personal mobile device is to be used as the primary connected device and, in response to receiving an operator confirmation, then carrying out the steps of discontinuing use of the first personal mobile device as the primary connected device and operating the vehicle electronics using the second personal mobile device as the primary connected device.

14. A method of managing short-range wireless communications between a vehicle and a plurality of short-range wireless communications devices, the method comprising:
  establishing a first connection between a first short-range wireless communications (SRWC) device and a wireless communications device using a first wireless protocol, wherein the wireless communications device is capable of transmitting and receiving wireless signals via the first wireless protocol, and wherein the wireless communications device is included in vehicle electronics of the vehicle;
  receiving a wireless near field communication (NFC) signal from a second SRWC device at an NFC that is installed as part of the vehicle electronics and that is connected to the wireless communications device, wherein the NFC reader is configured to receive NFC signals, and wherein the wireless NFC signal includes identifying information that is sufficient to identify the second SRWC device at least for purposes of carrying out a connection between the second SRWC device and the wireless communications device using the first wireless protocol;
  sending the identifying information from the NFC reader to the wireless communications device;
  prior to the receiving step and the sending step, establishing a second connection between the second SRWC device and the wireless communications device using the first wireless protocol;
  based on the identifying information received from the second SRWC device, configuring the vehicle electronics to operate using the second SRWC device as a primary connected device; and
  either disconnecting the first SRWC device from the wireless communications device or configuring the vehicle electronics to operate using the first SRWC device as a secondary connected device.

15. The method of claim 14, wherein the first SRWC device is disconnected from the wireless communications device and wherein the second SRWC device is connected to the wireless communications device using the first wireless protocol based on the identifying information received from the second SRWC device.

16. The method of claim 14, wherein the first wireless protocol is Wi-Fi, WiMAX, ZigBee, Wi-Fi direct, Bluetooth, Bluetooth Low Energy (BLE), or near field communication (NFC).

17. The method of claim 14, wherein the first SRWC device is a personal mobile device and the second SRWC device is a personal mobile device.

\* \* \* \* \*